United States Patent Office 2,910,438
Patented Oct. 27, 1959

2,910,438

PREPARATION OF AN EXTREME PRESSURE ADDITIVE AND GEAR OIL CONTAINING SAME

Paul R. Chapman and Allan A. Manteuffel, Crystal Lake, Ill., assignors to The Pure Oil Company, Chicago, Ill., a corporation of Ohio No Drawing. Application December 16, 1955
Serial No. 553,419

18 Claims. (Cl. 252—46.6)

This invention relates to extreme pressure lubricants and extreme pressure lubricant additives and to a method of preparing the same. More particularly, this invention relates to lubricating oil compositions useful under extreme pressure conditions, such as those encountered in the transmissions and differentials of cars and trucks having hypoid and other types of gears. This invention also particularly relates to a method of preparing the lubricating oil compositions so as to provide high-speed and high-torque characterictics.

In the lubrication of gear elements in automotive vehicles and various industrial machines, lubricants are generally used which are fortified with additives in order to augment the natural ability of the lubricants to provide lubricity at high pressures and/or temperatures. One such product which has been successfully used is a sulfurized-phosphorized lard oil, prepared in accordance with a method disclosed in Whittier et al., U.S. Patent No. 2,211,306. Sulfurized-phosphorized lard oils prepared by other similar procedures are also commercially available. Heretofore, sulfurized-phopshorized oils have been produced by sulfurizing the fatty oil with sulfur or sulfur halide, or similar sulfur-bearing compound, for a considerable length of time, usually until the mixture is shown to be substantially non-corrosive, and then phosphorizing the product with a phosphorus sulfide until the mixture is again rendered non-corrosive. Other prior art methods employ sulfurization-phosphorization in a single step, through the use of a phosphorus sulfide under suitable reaction conditions. Air blowing and other techniques, such as cooking under nitrogen or other inert gas, have been resorted to for the purpose of increasing yields of extreme pressure agents, and to enhance the beneficial characteristics of the additives. Prior art sulfophosphorized fatty oils, although showing valuable extreme pressure qualities, have largely failed to exhibit both satisfactory high-speed and high-torque characteristics necessary for an optimal general-purpose, all-weather gear oil or other type of extreme pressure lubricant subjected to the same range of conditions.

The nature of the environment in which hypoid and other gears function is such that it is advisable to have a lubricant present which serves both to cool and lubricate the gears to prevent or inhibit welding effects during normal operations, and also affords such protection under more severe conditions of operation, the extremes of which range from thick-film to boundary lubrication. Not only is increased oiliness over that normally furnished by unfortified mineral lubricating oils necessary in order to reduce friction in that zone of lubrication referred to as semi-boundary lubrication, where there is a transition from thick-film lubrication requiring only mineral oil, to boundary lubrication requiring anti-weld protection, but the extreme pressure oil must be able to withstand heavy loads, high temperatures and high pressures without undergoing degradation, break-down or polymerization to insoluble products or other compounds of decreased lubricity and cooling properties. Moreover, the extreme pressure lubricant must have high film strength at operating conditions so that it uniformly and tenaciously clings to the surface to be protected, allowing no zones of decreased lubricity or cooling to form or spread.

An ideal extreme pressure lubricant should therefore have good lubricity, good cooling properties, high film strength, good load-bearing ability, good resistance to the effects of high pressures and/or temperatures, good low temperature fluidity, and miscibility with the usual types of base oils. Moreover, it should preferably be inexpensive and simple to prepare, and should be capable of operating efficiently under a variety of conditions so that it may, for example, be used in both heavy industrial and vehicular engines of low speed and high torque and also in the lighter high-speed, low-torque machines, such as passenger vehicles. Extreme pressure additives, and lubricants incorporating the same, which are of the sulfurized-phosphorized fatty acid ester types, have not been adaptable to the wide range of conditions exemplified by high-speed, low-torque requirements and low-speed, high-torque requirements. That is, sulfur- and phosphorus-containing fatty acid ester additives added to base oils have imparted E.P. properties to the base oils, but usually not the ability to function under both low-speed, high-torque and high-speed, low-torque conditions. Consequently, these prior art gear oils cannot be considered to be ideal gear oils.

We have unexpectedly found that by processing fatty acid esters in a certain specified manner to a particular, critical concentration of sulfur and phosphorus, we are able to produce extreme pressure lubricant additives, especially suitable for gear oils, which not only pass the high-speed, low-torque CRC L–19 test but also the high-torque, low-speed CRC L–20 test. Moreover, the sulfurized-phosphorized lubricant additives need not be combined or admixed with relatively expensive solvent-refined lubricating oils. A petroleum lubricating oil, whether solvent-refined or conventionally acid-refined, is suitable as the base oil for the extreme pressure lubricants as long as it is of low or intermediate viscosity index. Oils of high viscosity index may be used if a minimum of about 15% by weight of an extract of a lubricating oil fraction, such as an extract from treating with phenol, furfural, sulfur dioxide or other aromatic and naphthenic hydrocarbon-separating solvent, is added to the base oil-extreme pressure additive mixture to assure satisfactory miscibility and solubility of the extreme pressure additive in the base oil.

Accordingly, it is an object of this invention to provide extreme pressure additives of enhanced properties, the method of preparing the same, and extreme pressure lubricants incorporating the same.

It is another object of this invention to provide improved extreme pressure sulfurized-phosphorized gear oils having the ability to withstand both high speeds and high torques for long periods of time without deterioration.

It is also an object of this invention to provide a process for the production of sulfurized-phosphorized gear oil additives having complete solubility in all types of conventionally refined and solvent-refined petroleum oils and having the ability to pass both the CRC L-19 and CRC L-20 gear oil tests.

It is still another object of this invention to provide extreme pressure additives and compositions containing the same, wherein the additives have fixed, specific, critical concentrations of sulfur and phosphorus introduced by a particular method.

In general, our invention relates to extreme pressure gear oil additives of improved stability under conditions of high speed and of high torque, compositions containing the same, and the method of producing the same.

More particularly, our invention involves the following procedural steps: sulfurizing a fatty acid ester to at least about 5% by weight of the composition, and to an endpoint of brown or tan color as determined by the copper strip test; and, thereafter, phosphorizing the sulfurized fatty acid ester with a phosphorus sulfide to at least about 0.4% by weight of the composition, and to a tan or pink color with the copper strip test.

A particular point of novelty is the preparation of a fatty acid ester of about 5-10% sulfur content by cooking for about 4 hours, that is, until the sulfur is chemically combined but still active, and then cooking with a sufficient amount of phosphorus sulfide to incorporate not less than about 0.40% by weight of phosphorus until the phosphorus is chemically combined with the sulfurized ester and the sulfur is more firmly bound but still active, and substantially non-corrosive. The extreme pressure additive may be characterized as a high phosphorus content, active-sulfur, fatty acid ester.

As the first step in the process of our invention, a fatty acid ester-containing material, such as lard oil, sperm oil, methyl oleate or wool grease, is chemically reacted with a sulfur-containing reagent, to sulfurize the fatty oil. The fatty acid ester may be any animal, vegetable, or marine oil, such as soybean, menhaden, sperm, wool grease, cottonseed, castor, rape seed, or mixtures thereof. Synthetic fatty acid esters, such as methyl oleate and mixtures thereof with other esters may also be used. Preferably, however, the fatty acid ester-containing material is one containing esters of mono-unsaturated fatty acids, such as oleic. The terms "fatty oil," "fatty body" and "fatty material" will be used hereafter to include natural occurring and synthetic esters of high molecular weight fatty acids (16-24 carbon atoms per molecule) in which the fatty acid radical contains not more than one unsaturated carbon to carbon bond. The fatty material is preferably treated with elemental sulfur, such as powdered flowers of sulfur, rather than a sulfur halide, such as sulfur mono-chloride, or other sulfurizing agent. The fatty oil is sulfurized with an amount of reagent equivalent to approximately 7-8% by weight sulfur, preferably about 7.5%, but a greater or smaller amount of sulfur may be utilized to react with the fatty material. Thus, 5-10% of sulfur may be incorporated into the fatty material. The elemental sulfur or sulfur-bearing reagent may be added in small amounts to an open kettle, for example, or other suitable reaction vessel containing the fatty bodies. The oil- and sulfur-containing mixture is then heated in the kettle, preferably to a temperature of approximately 325-340° F. The temperature may vary between 315° F. and 360° F. and still be satisfactory. The end-point of the reaction is reached when the reaction mixture exhibits a tan color on testing by the copper strip test. The copper strip test consists of immersing a copper strip in a sample of the product at about 300° F. for one minute or at about 210° F. for three minutes. When the copper strip after withdrawal from the reaction mixture at the end of the test period shows a light tan appearance, mild corrosivity of the reaction mixture and the presence of highly active sulfur is indicated, that is, sulfur is loosely bound to the fatty body. When 7-8% sulfur is incorporated into the fatty body, the reaction time necessary to produce the desired copper strip effect may vary to some degree, such as, for example, from about 3.5 to 4.5 hours. The sulfur must be present in sufficient amount and be of sufficiently active form after the subsequent phosphorization step to pass the high-speed, low-torque CRC L-19 test. The length of the sulfurization time will vary according to the amount of sulfur to be incorporated per unit of fatty body. It has been found that as the amount of sulfur added is lowered a decreased sulfurization time over that necessary for the 7-8% sulfur concentration is required to produce sulfurized material with enough sulfur present in sufficiently active form to pass the high-speed, low-torque test. Thus, the sulfurization reaction time may be decreased for a 6% sulfur concentration in fatty oil to about 2.5-3.5 hours, and to the same tan color of the copper strip test.

If the concentration of sulfur in the fatty oil is increased from about 8% to 10%, then the incorporation of sulfur into the fatty oil to the desired point evidenced by the tan color of the copper strip test will take longer, usually about 5-6 hours. The length of time required to obtain desired combination between the sulfur and fatty body will depend to some extent on the fatty body. For example, in the case of sperm oil, the sulfur is sufficiently reacted in two hours, at which time the desired tan color is obtained on the copper strip test.

The high-speed, low-torque CRC L-19 test is fully described in the CRC Handbook prepared by The Coordinating Research Council, Inc. The test is used for determining the load-carrying characteristics of universal gear lubricants in axles of Chevrolet passenger vehicles under conditions of high speeds and low torque. After the prescribed series of runs at various specified speeds and for various specified distances, the hypoid third-member assembly which contains the test lubricant is inspected for scoring of the ring gear and pinion gear teeth. If there is no scoring, a duplicate test is run with a new third-member assembly and a fresh lubricant. A test lubricant passes this test, according to the MIL-L-2105 specifications for gear oils, when both test samples cause substantially no scoring as above described.

A distinct difference is to be noted in the sulfurization step of the process of our invention over the prior art, in that our sulfurization is conducted for a relatively shorter period of time, such as about 4 hours for 7-8% by weight of sulfur when sulfurizing lard oil, so as to provide a sulfurized fatty material containing a more active sulfur, instead of the more closely bound, relatively inactive, sulfur-containing prior art fatty esters prepared over longer sulfurization times, such as about 7 hours, for the incorporation of 7-8% by weight of sulfur into the fatty ester or oil, which exhibits a peacock-colored copper strip in the copper strip test indicating low sulfur activity.

The mixture during the period of heating may be agitated in order to provide adequate dispersion and inter-mixing of the ingredients and uniform heat transfer to all parts of the mixture. After completion of the reaction (as evidenced by the copper strip test), the sulfurized fatty body should have substantially all of the sulfur of the sulfur-containing reagent chemically bound in it in the form of active sulfur. The mixture may then be rapidly cooled to about 150° F., to stop the reaction and thereafter permitted to slowly cool to room temperature. Alternatively, the mixture may be cooled to the temperature, as set forth below, necessary for the phosphorization.

Following the sulfurization of the fatty body, as the next step of the process of our invention, the sulfurized fatty body is phosphorized with any suitable phosphorus sulfide, such as phosphorus pentasulfide or phosphorus sesquisulfide, preferably the latter. Phosphorus sesquisulfide, the reagent of choice, contains trivalent phosphorus and forms a complex phosphorus-and-sulfur-bearing end-product in which substantially all of the phosphorus of the phosphorus sulfide is present in the reaction product. Under the conditions of reactions as presented in our process, substantially all of the sulfur of the phosphorus sulfide is also incorporated in the reaction product. The sulfurized fatty body is first mixed with the finely divided phosphorus sesquisulfide, for example in an open kettle or other suitable reaction vessel, and in the proportion of about 95–99.2 parts of sulfurized oil to about 5–0.8 parts by weight of the phosphorus sesquisulfide.

It has been found that in order for the extreme pressure lubricant prepared by our process to pass the CRC L–20 high-torque low-speed test, at least about 0.4–0.45% phosphorus by weight of the E.P. base must be introduced. If less phosphorus is present, the gears may score, discolor and the like.

The high-torque, low-speed CRC L–20 test is fully described in the CRC Handbook, prepared by the Coordinating Research Council, Inc. This test is designed to determine the load-carrying characteristics, wear, stability and corrosion characteristics of universal gear lubricants in army truck axles under conditions of high torque and low speed. A new ¾-ton army truck hypoid rear-axle carrier is tested under controlled, specified conditions utilizing the test lubricant, and all parts, that is, the axle shafts, axle housing, carrier housing, pinion tooth surfaces, pinion assemblies and differential pins, are inspected after the test period for signs of corrosion, wear, discoloration and deposits. Additionally, the test lubricant is examined for the presence of water, foreign matter, sludge, discoloration and the like. A test lubricant passes this test, according to MIL–L–2105 specifications for gear oils, by evidencing ability to protect the test equipment from corrosion, substantial wear, discoloration and deposits, while remaining free of water, foreign matter, sludge and the like over the test period.

It should be pointed out that the CRC L–19 and CRC L–20 tests are standard tests for evaluating extreme pressure lubricants, particularly gear oils and the like, and represent severe test conditions accurately separating stable, efficient gear lubricants from unstable, inferior lubricants which are subject to deleterious structural change during normal use and which insufficiently protect the lubricated parts.

Heat is applied to the mixture of the phosphorus sulfide and the sulfurized fatty oil, preferably while constant agitation is carried on, and the temperature is raised to about 220–230° F. The temperature for the phosphorization has to be kept below about 235° F. during the reaction period in order to prevent excessive polymerization and to prevent phosphorus from vaporizing from the mixture and being lost. The reaction time will run approximately 4–20 hours, i.e., until all the phosphorus of the phosphorus sulfide is chemically incorporated into the fatty oil.

As the quantity of phosphorus introduced into the reaction mixture is increased the reaction time must be increased accordingly, since it will take longer to incorporate more phosphorus into the sulfurized fatty material. Usually, no increased beneficial effects result from increasing the phosphorus content beyond about 2.5%. Phosphorization is continued until the reaction mixture produces a tan or pink colored strip on the copper strip test. By carefully balancing the proportions of sulfur and phosphorus introduced into the fatty body, and controlling the reaction times and temperatures, a non-corrosive product may be prepared which has sufficient sulfur and phosphorus chemically bound in the required state to enable the lubricant to pass both the CRC L–19 and the CRC L–20 tests, and still have a product which is capable of passing the CRC–L–22 stability test. The endpoint of the reaction is determined by the appearance of a copper strip after immersion in a sample of the reaction mixture at 210° F. for 3 minutes. The copper strip should show a pink color indicating a satisfactory level of sulfur activity.

After the desired incorporation of the phosphorus sesquisulfide into the sulfurized fatty material has taken place, the mixture is cooled to stop the reaction, and the sulfurized-phosphorized base should contain preferably approximately 6–9% by weight of sulfur, and approximately 0.4–2.5% by weight of phosphorus.

The extreme pressure, sulfurized-phosphorized fatty ester additive of our invention may be used alone in the base oil to be imparted with the extreme pressure properties of good stability and lubricity under normal conditions of high torque and low speed, as well as high speed and low torque, or may appear in the base oil with other additives which act independently or synergistically to impart E.P. properties to the oil. The solubility of the sulfurized-phosphorized fatty material is sufficiently great so that assisting agents and solubilizers, such as phenol extract as above-mentioned are not required to prevent the additive from precipitating when admixed with oils, except with high V.I. oils. The additive may be used in various concentrations, depending on the degree of extreme pressure protection desired. Concentrations of 6–15% by weight of the additive are effective, depending on the load-carrying requirements of the oil. The addition of 0.5 to 2.0% by weight of dibenzyl disulfide, to the finished oil composition improves its load-carrying properties.

The following examples will illustrate the preparation of the desired additive of our invention and its use in lubricants:

*Example I*

Lard oil, having the following characteristics, was used as the fatty body.

Characteristics:
Sap. number _____ 196
Iodine number _____ 69.5
Titer, ° C. (extracted fatty acid) _____ 35.8
Percent free fatty acid _____ 9.9
Pour point, ° F. _____ +50

About 7.5 parts by weight of elemental sulfur were added in finely divided form to about 91.7 parts by weight of the lard oil with constant stirring, and the temperature of the mixture was adjusted in an open kettle to 330–340° F. After a period of about 4 hours during which the mixture was continuously agitated, the reaction mixture was rapidly cooled to approximately 220° F. The reaction mixture at this point analyzed 7.5% by weight of sulfur, and exhibited a tan color in the copper strip test. Then 0.8 part by weight of phosphorus sesquisulfide in finely divided form was slowly added thereto under constant agitation. The reaction was allowed to proceed at 220–230° F. for a period of 8 hours, after which time the reaction mixture was rapidly cooled to 120° F. and thereafter slowly cooled to room temperature. The resulting E.P. base had the following characteristics:

API gravity _____ 12.0/14.0
SUS viscosity at 210° F. _____ 250/350
Percent sulfur _____ 7.2/7.6
Percent phosphorus _____ 0.4/0.45
Copper strip (1 min. at 300° F.) _____ Tan color This base was blended into a finished oil together with dibenzyl disulfide, Acryloid 150, a V.I. improver and pour depressor, a methacrylate ester polymer, having a molecular weight of about 10,000–15,000 (see Patent No. 2,681,891), and DC–200, a silicone foam inhibitor (see Patent No. 2,589,317), and the resulting blends tested for load-carrying properties and storage stability. The following table lists the composition and characteristics of these blends:

|  | Blend I | Blend II |
|---|---|---|
| Composition, percent by weight: |  |  |
| E.P. base | 8.2 | 8.2. |
| Dibenzyl disulfide | 0.8 | 0.8. |
| Smackover heavy oil | 49 |  |
| Smackover light oil | 42 |  |
| Bright stock extract |  | 21.0. |
| Bright stock |  | 22.0. |
| Neutral |  | 47.5. |
| Acryloid 150 |  | 0.5. |
| DC-200 | 0.001 | 0.001. |
| A.P.I. gravity | 17.4 | 22.7. |
| Flash, °F | 380 | 480. |
| SUS viscosity at— |  |  |
| 100° F | 925 | 977. |
| 130° F | 383 | 402. |
| 210° F | 88 | 86.7. |
| Viscosity index | 102 | 95. |
| Pour point, °F | −20 | +5. |
| Channel point, °F | −15/−20 | −5/−10. |
| Rust protection | Pass | Pass. |
| Copper strip (1 hr. at 250° F.) | Tan stain | Do. |
| SAE machine at 1,000 r.p.m. | 150 | 123. |
| SAE machine at 500 r.p.m. (after heating) | 450 | 453. |
| Timken test (800 r.p.m.): |  |  |
| Load | 45 lbs | 65. |
| Pressure | 23,300 p.s.i. | 28,400 p.s.i. |
| CRC L-19 test (high speed) | Pass (duplicate) | Pass (duplicate). |
| CRC L-20 test (high torque) | Pass | Pass. |
| CRC L-22 (storage stability) | do | Do. |

The oils used in making blends I and II above had the following characteristics:

|  | Smackover heavy | Smackover light | Bright stock | Neutral | Extract |
|---|---|---|---|---|---|
| API gravity | 11.6–12.0 | 25.7 | 24.2 | 29.1 | 12.7 |
| Flash, °F | 510–525 | 310 | 565 | 445 | 545 |
| Fire, °F |  |  | 635 | 490 | 625 |
| SUS viscosity at: |  |  |  |  |  |
| 100° F | 75,000–80,000 | 61.1 | 2,926 | 208.1 | 28,000 |
| 130° F | 16,026–17,107 | 46.7 | 1,052 | 107.5 | 825 |
| 210° F | 972–1005 | 34.6 | 160.5 | 46.5 | 353.6 |
| Viscosity index |  | 85 | 53 | 92 | 91 | 12 |
| Pour point, °F |  |  | 0 | 0 | +60 |
| Carbon res | 13.74–14.10 | 0.01 | 1.13 | 0.01 | 4.31 |
| Sulfur | 3.33–3.47 | 1.63 | 0.84 | 0.48 | 2.41 |

It should be noted that in addition to having excellent load-carrying and storage stability properties the blends had higher V.I.'s than the oils used in preparing the blends. This ability of the high phosphorus E.P. base to raise the V.I. of mineral oils is particularly noticeable in the case of low V.I. oils.

The Timken extreme pressure lubricant testing machine (CRC Designation EL–18–54) is used in the performance of the Timken CRC Designation L–18–54 Test, fully described in the CRC Handbook, 1946, prepared by the Coordinating Research Council, Inc. It is a standard test for evaluating the beam load necessary to produce scoring of a test block under the rubbing influence of a rotating mandrel.

The CRC L–12–445 foam test is fully described in the CRC Handbook, 1946, prepared by the Coordinating Research Council, Inc. and is intended to determine the foaming characteristics of a lubricating oil.

Example II

A sulfurized-phosphorized fatty oil was prepared according to the procedure of Example I with the same constituents, except that the sulfurization reaction time was extended from 4 to 8 hours. It was found on testing the product in a base oil that the oil failed to pass the CRC L–19 high-speed, low-torque test, as determined by the requirements of MIL–L–2105 specifications for gear oils, though it passed the CRC L–20 test. The MIL–L–2105 specifications state that a gear oil in order to pass the CRC L–19 test must not score the ring-gear or pinion-gear teeth in duplicate tests, and in order to pass the CRC L–20 test, the gear oil must show no evidence of surface fatigue, scoring, discoloration, or corrosion, and wear should be a minimum under high-torque, low-speed conditions. Also, all metal parts of the differential unit must meet the requirements for discoloration, corrosion, deposits, and wear as set forth in the procedure. Thus, the ability of an extreme pressure additive comprising sulfurized-phosphorized fatty oil to pass both the CRC–L–19 and CRC–L–20 tests does not merely depend on the concentration of the sulfur and the phosphorus, but also depends on the state of activity and degree of binding of the sulfur and phosphorus. In this example, the increased sulfurization time over that of Example I reduced the activity of the sulfur incorporated into the fatty oil by binding it more closely to the fatty oil and prevented passage of the high-speed, low-torque test.

Example III

To further illustrate the storage stability of the novel high phosphorus content E.P. base in oils of intermediate viscosity, S.A.E. 90 blends were prepared by mixing 8.2% by weight of sulfurized-phosphorized lard oil, 0.8% of dibenzyl disulfide and 91% of mineral oils. The E.P. base was made in the same manner set forth in Example I and had a sulfur content of 7.5 and phosphorus content of 0.44. It was prepared from the same lard oil. One blend contained phenol extract to increase storage stability of the blend. The characteristics of the blend are given below:

|  | Blend III | Blend IV | MIL-L-2105, SAE 90 grade spec. |
|---|---|---|---|
| Composition, percent by weight: |  |  |  |
| E.P. base | 8.2 | 8.2 |  |
| Dibenzyl disulfide | 0.8 | 0.8 |  |
| Mineral oil (V.I., 86; SUS vis. at 210° F., 82.3; pour point, °F., 0) | 91.0 | 86 |  |
| Extract (phenol extract from neutral oil) |  | 5.0 |  |
| API gravity | 25.5 | 25.3 |  |
| SUS viscosity at: |  |  |  |
| 100° F | 1,008 | 918 |  |
| 210° F | 88.4 | 83.8 | 80–90. |
| Viscosity index | 95 | 94 | 85 min. |
| Pour point, °F | 0 | 0 |  |
| CRC L-22: |  |  |  |
| 30 days | 0.004 | 0.000 | 0.26% max. separation. |
| 60 days |  | 0.002 |  |
| 90 days |  | 0.000 |  |
| 120 days | Trace of clear varnish type separation. | No separation. |  |

It is apparent that without the aid of a solubility promoter the blend passes the MIL–L–2105 test and with 5% of phenol extract no precipitation occurred.

Example IV

A series of blends was prepared to demonstrate stability of the novel high phosphorus-containing E.P. base in high viscosity index oils, particularly bright stock. The following table demonstrates that in the absence of a solubility promoter such as solvent extract, the solubility of the base is poor but that by the addition of extract a product having satisfactory stability is obtained.

|  | Blend V | Blend VI | Blend VII | Blend VIII | MIL-L-2105 spec. |
|---|---|---|---|---|---|
| Composition, percent by weight: |  |  |  |  |  |
| E.P. base [1] | 8.2 | 8.2 | 8.2 | 8.2 |  |
| Dibenzyl disulfide | 0.8 | 0.8 | 0.8 | 0.8 |  |
| Bright stock | 53 | 57 | 59 | 30 |  |
| Neutral | 38 | 24 | 17 | 46 |  |
| Extract |  | 10 | 15 | 15 |  |
| SUS viscosity at: |  |  |  |  |  |
| 210° F | 82 | 87.7 | 89.9 | 77.1 | 80–90. |
| 130° F | 341.5 | 386.1 | 408.2 | 318.9 |  |
| 100° F | 776 | 902 | 968 | 734.0 |  |
| Viscosity index | 106 | 104 | 101 | 100 | 85 min. |
| Pour point, °F | +10 | +5 | +10 | +5 |  |
| Storage stability, shelf, RT: |  |  |  |  |  |
| Days | 7 | 14 | 14 | 60 |  |
| Separation | Light | Light | Very light | None |  |
| CRC-L-22, percent non-petroleum: |  |  |  |  |  |
| 30 days | 1.1 by vol | 0.35 by vol | 0.10 | 0.00 | 0.25 max. |
| 60 days | 0.91 | 0.36 | 0.75 | 0.00 |  |

[1] Prepared from lard oil as in Example I.

The characteristics of the E.P. base, oils and extract used in preparing blends V–VIII are as follows:

|  | Bright stock | Neutral | Extract | E.P. base |
|---|---|---|---|---|
| API gravity | 26.5 | 31.4 | 12.7 | 11.6 |
| Flash, °F | 570 | 440 | 545 | 440 |
| Fire, °F | 640 | 480 | 625 | 480 |
| SUS viscosity at: |  |  |  |  |
| 100° F | 2,347 | 177.2 | 28,000 |  |
| 130° F | 887 | 95.5 | 825 |  |
| 210° F | 150.6 | 45.1 | 353.6 | 258 |
| Viscosity index | 100 | 101 | 12 |  |
| Pour point, °F | +5 | 0 | +60 | +60 |
| Percent carbon residue | 0.65 | 0.02 | 4.31 |  |
| Percent sulfur | 0.48 | 0.19 | 2.41 | 8.95 |
| Percent phosphorus |  |  |  | 0.41 |

Example V

The high phosphorus content E.P. base made in accordance with this invention has the further advantage of making possible the preparation of multigraded oils, as for example, an oil meeting the specifications for both SAE 80 and 90 grades. This is made possible by reason of the enhancement of viscosity index resulting from blending the base with mineral oil. The following blend illustrates this feature of the composition.

|  | Blend IX | SAE spec. |
|---|---|---|
| Composition, percent by weight: |  |  |
| E.P. base | 8.2 |  |
| Dibenzyl disulfide | 0.8 |  |
| Acryloid 618 | 0.8 |  |
| Bright stock | 29.2 |  |
| Neutral | 46 |  |
| Extract | 15 |  |
| SUS viscosity at: |  |  |
| 210° F | 82.3 | 75–120. |
| 130° F | 339.5 |  |
| 100° F | 772.0 |  |
| 0° F. (extrap.) | 88,000 | 15,000 min.–100,000 max. |
| Viscosity index | 107 |  |
| Pour point, °F | +5 |  |
| Channel point, °F | −5/−10 |  |
| API gravity | 24.5 |  |
| Storage stability, shelf, RT: |  |  |
| Days | 90 |  |
| Separation | None |  |
| CRC-L-22, percent nonpetroleum: |  |  |
| 30 days | 0.00 |  |
| 60 days | 0.00 |  |

The E.P. base, oils and extract used in preparing this blend are the same as those used in Example IV. The Acryloid is a polymer of methacrylic acid and long chain alcohols and is added to improve the viscosity index of the finished oil.

Example VI

The benefits to be obtained from our invention are realized to a greater extent by increasing the phosphorus content to an amount between 1 and 2.5% by weight of the sulfurized-phosphorized fatty material. The following table gives the data with respect to several such bases.

|  | Base I | Base II | Base III |
|---|---|---|---|
| Composition, parts by weight: |  |  |  |
| Lard oil | 90 | 92.5 | 90.0 |
| Sulfur | 7.5 | 5.0 | [1] 5.0 |
| $P_4S_3$ | 2.5 | 2.5 | 5.0 |
| Sulfurization: |  |  |  |
| Temperature, °F | 320–330 | 330–340 | 330–340 |
| Time (hours) | 8 | 3 | 2 |
| Phosphorization: |  |  |  |
| Temperature, °F | 220–230 | 220–230 | 215–225 |
| Time (hours) | [2] 5 | 13 | 18 |
| Viscosity | 536 | 354 | 409 |
| A.P.I. gravity | 10.7 | 11.3 | 11.7 |
| Sulfur, percent | 8.22 | 7.65 | 6.2 |
| Phosphorus, percent | 1.32 | 1.24 | 2.17 |

[1] 80% sulfur was added at beginning and remaining 20% after one hour.
[2] Air blowing.

These bases were blended into finished gear oils. The composition and characteristics of the oils are given in the following table.

|  | Blend X | Blend XI | Blend XII |
|---|---|---|---|
| Composition, percent by weight: |  |  |  |
| Base | 8.2 (I) | 8.2 (II) | 8.2 (III) |
| Dibenzyl disulfide | 0.8 | 0.8 | 0.8 |
| Extract |  | 21 | 21 |
| 160 bright stock | 46 | 22 | 22 |
| 200 neutral | 45 | 47.4 | 47.4 |
| Acryloid 150 |  | 0.5 | 0.5 |
| Duomeen T Dioleate |  | 0.1 | 0.1 |
| SUS viscosity at: |  |  |  |
| 210° F | 81.2 | 84.6 | 85.3 |
| 130° F | 352.3 | 385.7 | 391.2 |
| 100° F | 819 | 933.0 | 943.0 |
| Viscosity index | 100 | 94 | 95 |
| Pour point, °F | +15 | −10 | −10 |
| Storage stability, shelf, RT: |  |  |  |
| Separation | None | None | None |
| Days | 90 | 90 | 90 |
| CRC-L-22, percent non-petroleum: |  |  |  |
| 30 days | 0.00 |  |  |
| 60 days | 0.00 |  |  |

The high phosphorus content bases exhibit unusual susceptibility to pour point depressors as demonstrated by blends XI and XII, containing E.P. bases II and III. These blends had pour points of 15 to 25° F. lower than comparable oils not containing Acryloid 150. Moreover, a similar blend containing base made with 0.4 part by weight of $P_4S_3$ to 7.5 parts of sulfur and 92.1 parts of lard oil had a pour point of +10° F. with 0.5% Acryloid.

The characteristics of the various products used in preparing blends X to XII are as follows:

|  | Phenol extract from bright stock | 160 bright stock | 200 neutral |
|---|---|---|---|
| API gravity | 14 | 24.1 | 29.1 |
| Flash, °F | 555 | 575 | 425 |
| Fire, °F | 630 | 650 | 485 |
| SUS viscosity at: |  |  |  |
| 100° F | 27,000 | 3,261 | 212.4 |
| 130° F |  | 1,144 | 109 |
| 210° F | 369.2 | 169.1 | 46.9 |
| Viscosity index | 26 | 91 | 93 |
| Pour point, °F | +65 |  | 0 |
| Carbon res., percent | 4.54 | 1.2 | 0.01 |
| Percent sulfur | 2.35 | 0.84 | 0.41 |

Duomeen T Dioleate is the di-oleic acid salt of a fatty amine having the formula

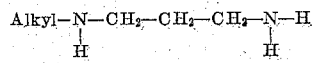

in which the alkyl group is a mixture of $C_{16}$ to $C_{18}$ saturated hydrocarbon chains and a $C_{18}$ mono-unsaturated chain derived from tallow acids. This product has the ability when used in small amounts of preventing precipitation in the E.P. lubricant, thereby improving its storage stability.

*Example VII*

In order to demonstrate that the invention is applicable to other oils and esters besides lard oil, a series of sulfurized-phosphorized E.P. bases were prepared from sperm oil and blended into finished oils. The data on two such bases is set out below.

|  | Base IV | Base V |
|---|---|---|
| Composition, parts by weight: |  |  |
| 45° sperm oil | 91.7 | 89. |
| Sulfur | 7.5 | 10. |
| $P_4S_3$ | 0.8 | 1.0. |
| API gravity | 19.7 | 15.4. |
| SUS viscosity at 210° F | 92.6 | 231.4. |
| Sulfurization: |  |  |
| Temperature, °F | 330–340 | 330–340. |
| Hours | 2 | 6. |
| 1 min. copper strip (300° F.) | Brown | Brown. |
| Phosphorization: |  |  |
| Temperature, °F | 220–230 | 220–230. |
| Hours | 8 | 4. |
| 3 min. copper strip (220–230° F.) | Pink | Pink. |
| Percent sulfur | 7.35 | 10.2. |
| Percent phosphorus | 0.44 | 0.53. |

These bases were blended into gear lubricants having the following composition and characteristics.

|  | Blend XIII | Blend XIV |
|---|---|---|
| Composition, weight percent: |  |  |
| E.P. base | 8.2 (IV) | 8.2 (V) |
| Dibenzyl disulfide | 0.8 | 0.8 |
| Extract | 21 | 21.0 |
| Bright stock | 28 | 28.0 |
| Neutral | 41.37 | 41.34 |
| Foam inhibitor | 0.03 | 0.06 |
| Acryloid 150 | 0.5 | 0.5 |
| Duomeen T Dioleate | 0.1 | 0.1 |
| SUS viscosity at 210° F | 85.2 | 83.6 |
| Channel point, °F | −30/−35 | −30/−35 |
| Modified SAE (weight loss, mg.) | 30.6 | 29.2 |
| Timken: |  |  |
| Beam load, lbs | 50 | 45 |
| Pressure, p.s.i. | 26,000 | 24,000 |

The oils and extract used in preparing blends IV and V had the following characteristics:

|  | Bright stock | Neutral | Phenol extract from bright stock |
|---|---|---|---|
| Carbon res., percent | 1.26 | 0.02 | 4.31 |
| Flash, °F | 580 | 430 | 545 |
| Fire, °F | 640 | 485 | 625 |
| API gravity | 24 | 29.1 | 12.9 |
| Pour point, °F | −5 | 0 | +60 |
| SUS viscosity at: |  |  |  |
| 100° F | 3,236 | 202.2 | [1] 28,000 |
| 130° F | 1,139 | 104.1 |  |
| 180° F |  |  | 825 |
| 210° F | 169 | 46.1 |  |
| Viscosity index | 91 | 90 | 12 |
| Percent sulfur | 0.84 | 0.48 | 2.41 |

[1] Extrap.

As previously pointed out, the sulfurization reaction with sperm oil proceeds more rapidly to the desired point, namely, a tan or brown copper strip, than in the case of lard oil. E.P. bases IV and V further demonstrate that longer sulfurization periods are necessary for higher amounts of sulfur but that the phosphorization period can be shortened as the sulfurization period is lengthened.

In the event it is desired to store the E.P. bases made in accordance with this invention without blending into finished oil, we have found it desirable, particularly when the base is mixed with dibenzyl disulfide, to add to the base about 5–15% by weight of solvent extract from neutral oil to improve both its storage stability and fluidity. Whereas 7.5 parts of sulfurized-phosphorized lard oil base containing 7.7 sulfur and 0.45% phosphorus mixed with 0.5 part by weight of dibenzyl disulfide form a trace of precipitate and the base is viscous, when 0.5 or 1 part by weight of phenol extract from neutral oil is added no precipitation occurred and the base was fluid.

The extract used had the following characteristics:

| API gravity | 17 |
|---|---|
| Flash, °F | 375 |
| Fire, °F | 425 |
| SUS viscosity at: |  |
| 100° F | 161.3 |
| 130° F | 82.4 |
| 210° F | 40.7 |
| Viscosity index | −27 |
| Pour point, °F | +35 |
| Carbon res., percent | 0.16 |
| Percent sulfur | 2.10 |

A complete E.P. additive can be made embodying the novel high phosphorus content base by mixing therewith the required amount of pour point depressor, solubility promoter, foam inhibitor and V.I. impover. Or, if desired, a concentrate can be prepared which is universally soluble in all types of mineral lubricating stocks by dissolving the E.P. base and other additives, if desired, in a solvent extract from neutral oil such as the phenol extract described in Example VII. A satisfactory concentrate having excellent solubility and load-carrying properties can be prepared by blending 8.2 parts of sulfurized-phosphorized base, 0.8 part of dibenzyl disulfide and 10 parts by weight of solvent extract. Any neutral extract prepared by extraction with a solvent, such as furfural and nitrobenzene, for extracting aromatics from lube oil stocks, is satisfactory.

It will be seen, therefore, that by carefully regulating the sulfurization reaction so as to combine the sulfur in a state where it is active but not corrosive, as determined by the brown or tan color obtained on the copper strip test, and then phosphorizing with $P_4S_3$ so that the fatty body contains not less than about 0.4% phosphorus in tightly combined state, as indicated by its non-corrosivity in the copper strip test (brown or tan at 300° F. or pink at 210° F.–230° F.), an additive is obtained that is capable of imparting unusual properties to mineral lubricating oils used for carrying high loads.

We claim and particularly point out as our invention:

1. The process of preparing an extreme pressure additive which comprises sulfurizing fatty oil with sulfur at a temperature of 315 to 360° F. to a sulfur concentration of about 5% to 10% by weight of the fatty oil for a period of 2.5 to 6 hours until it produces a tan color upon immersing in the sulfurized oil at a temperature of 300° F. a copper strip for 1 minute, stopping the reaction at this stage and thereafter phosphorizing said sulfurized fatty oil at a temperature of about 220 to 235° F. to a concentration of bound phosphorus in the fatty oil of at least about 0.40% by weight of the sulfurized-phosphorized fatty oil until the product gives a tan colored copper strip upon immersion in the product for 1 minute at 300° F.

2. The process of claim 1 in which the sulfurization reaction is carried out with sulfur at about 330–340° F. and the phosphorization is carried out with phosphorus sesquisulfide.

3. The process of claim 2 in which the concentration of bound phosphorus is about 0.40–2.50% by weight of the sulfurized-phosphorized fatty oil.

4. The process of claim 3 in which the fatty oil is lard oil.

5. The process of claim 3 in which the fatty oil is sperm oil.

6. The process of preparing an extreme pressure additive which comprises reacting lard oil with about 5–10%, based on the weight of said lard oil, of sulfur at about 330–340° F. in a sulfurization zone for a period of 2.5 to 6 hours until the sulfurized lard oil produces a tan colored copper strip upon immersion for 1 minute at 300° F., stopping the reaction at this stage and thereafter phosphorizing said sulfurized lard oil with about 0.8–5% by weight, based on the weight of said lard oil, of phosphorous sesquisulfide until the sulfurized-phosphorized lard oil produces a tan colored copper strip upon immersion for 1 minute at 300° F.

7. A high-torque, high-speed extreme pressure additive consisting essentially of a sulfurized-phosphorized fatty oil having about 5% to 10%, based on the weight of said fatty oil, of sulfur incorporated therein, and about 0.40% to 2.5%, based on the weight of said fatty oil, of phosphorus bound therein and which produces a tan colored copper strip when said strip is immersed in said additive for 1 minute at 300° F.

8. The additive of claim 7 in which the sulfur is present in an amount of about 5–10% by weight and in which said bound phosphorus is present in an amount of about 0.40–2.50% by weight.

9. A lubricant comprising a major amount of mineral lubricating oil and sufficient additive as defined in claim 7 to substantially improve the load-carrying properties of the oil.

10. The additive of claim 8 in which the fatty oil is lard oil in which the sulfur is present in the lard oil in an amount of about 6–8% by weight of the additive, and in which the bound phosphorus is present in the additive in an amount of about 1.0–2.5% by weight of the additive, said additive producing a tan colored copper strip when said strip is immersed in said additive for 1 minute at 300° F.

11. The additive of claim 8 in which the fatty oil is sperm oil.

12. A lubricant comprising a major amount of mineral lubricating oil and sufficient additive as defined in claim 8 to substantially improve the load-carrying properties of the oil.

13. A lubricant comprising a major amount of mineral lubricating oil and sufficient additive as defined in claim 9 to substantially improve the load-carrying properties of the oil.

14. A lubricant comprising a major amount of mineral lubricating oil and sufficient additive as defined in claim 10 to substantially improve the load-carrying properties of the oil.

15. A lubricant in accordance with claim 13 containing a small but sufficient amount of methacrylate ester polymer, having a molecular weight of about 10,000–15,000, to materially lower the pour point of said lubricant.

16. A lubricant in accordance with claim 14 containing a small but sufficient amount of methacrylate ester polymer, having a molecular weight of about 10,000–15,000, to materially lower the pour point of said lubricant.

17. A lubricant in accordance with claim 15 which contains a minimum of 15% by weight of aromatic extract from the extraction of neutral oil.

18. A lubricant in accordance with claim 16 which contains about 21% of aromatic extract from solvent extraction of neutral oil.

References Cited in the file of this patent

UNITED STATES PATENTS

| | | |
|---|---|---|
| 2,211,306 | Whittier | Aug. 13, 1940 |
| 2,361,522 | Zimmer | Oct. 31, 1944 |
| 2,382,121 | Whittier | Aug. 14, 1945 |
| 2,407,954 | Fenske | Sept. 17, 1946 |
| 2,420,280 | Yule | May 6, 1947 |
| 2,483,600 | Stucker | Oct. 4, 1949 |